United States Patent [19]

Köhnlechner

[11] Patent Number: 4,576,049
[45] Date of Patent: Mar. 18, 1986

[54] PRESSURE SENSOR WITH RINGED CHAMBER

[75] Inventor: Rainer Köhnlechner, Schloss-Holte, Fed. Rep. of Germany

[73] Assignee: Ermeto Armaturen GmbH, Bielefeld, Fed. Rep. of Germany

[21] Appl. No.: 599,394

[22] Filed: Apr. 12, 1984

[30] Foreign Application Priority Data

Apr. 13, 1983 [DE] Fed. Rep. of Germany ....... 3313261

[51] Int. Cl.$^4$ ............................ G01L 7/08; G01L 9/06
[52] U.S. Cl. ....................................... 73/706; 73/708; 73/727; 338/4; 338/42; 374/143
[58] Field of Search ................. 73/706, 708, 727, 721, 73/726, 720, 754, DIG. 4, 431; 338/4, 42; 374/143

[56] References Cited

U.S. PATENT DOCUMENTS 3,198,013 8/1965 Erdely .................................. 73/754
3,237,138 2/1966 Kooiman et al. ...................... 338/4

Primary Examiner—Donald O. Woodiel
Attorney, Agent, or Firm—Frederick L. Tolhurst

[57] ABSTRACT

A pressure measuring device wherein a housing (1) includes a pressure sensor (2) in a pressure chamber (4) and an electronic circuit (14) in a non-pressurized chamber (6). Borings (7) extend between pressure chamber (4) and non-pressurized chamber (6) and accommodate contacts that electrically connect pressure sensor (2) and electronic circuit (14). A pressure membrane (3) cooperates with housing (1) to further define pressure chamber (4) and isolate the device from the fluid system. Pressure chamber (4) is filled with a medium that transmits the system pressure to pressure sensor (2). Pressure sensor (2) measures the pressure and provides an output signal to electronic circuit (14).

14 Claims, 7 Drawing Figures

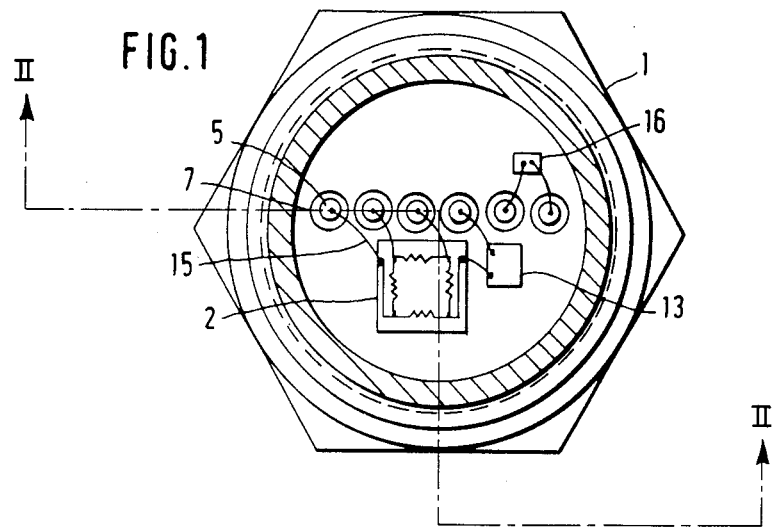
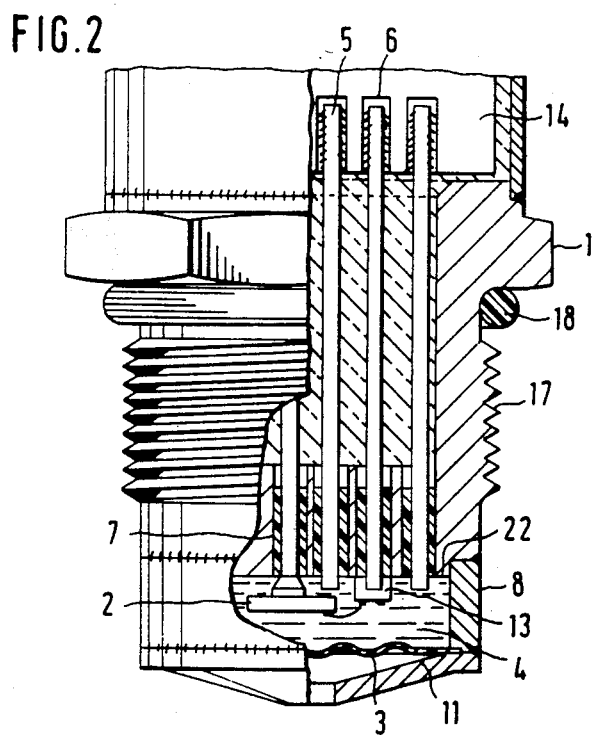

PRESSURE SENSOR WITH RINGED CHAMBER

BACKGROUND OF THE INVENTION

1. Field of the Invention

The subject invention is directed to devices for measuring pressures, especially high pressures, and temperatures in a hydraulic or pneumatic system. More specifically, the subject invention concerns devices that incorporate both a piezo-resistive pressure measuring cell and an electronic circuit in one housing to form an integral component.

2. Description of the Prior Art

The usual types of manometers known in the prior art are generally read off only at intervals. Furthermore, such devices are frequently inadequate with regard to the precision required for certain measurements. In contrast, electronic measuring devices afford a continuous recording of the measured values and a rapid processing of the signals with a high degree of measuring accuracy.

Hydraulic systems are becoming increasingly complicated in the course of the rapid technical development. One consequence of this is that the hydraulic systems are placing increasingly higher demands on the required accuracy and switching speed of associated systems. As a result, there is a demand for improved pressure and temperature measuring devices that will not only continuously indicate the actual values measured by the electronic circuit, but will also give an instantaneous or realtime indication, of interference in the installation.

In piezo-resistive pressure measuring cells known in the prior art, the piezo-resistive semiconductor element (silicium chip) that is used for recording the pressure is connected to the corresponding contacts by means of binding wires. Thus, the entire sensor housing is standardized from semiconductor technology and is similar to that used for transistors, operational amplifiers, and the like. Consequently, such prior art sensor housings are unsuitable for measuring high pressures because the pressure influence on the housing distorts the measurement. Moreover, the housing often cannot withstand the higher pressures that are to be measured such that it is subject to deformation.

Auslegeschrift No. 26 30 640 describes a piezo-resistive pressure measuring cell known in the prior art. The cell therein described is located inside an oil-filled transferring membrane housing. Base pins are embedded in molded glass recesses that extend along the periphery of the transfer membrane housing. The pressure measuring cell unit is bonded onto a small base wafer that has a bigger diameter than the cell itself. In order to lead into the base pins, inlets are provided along the periphery which correspond to the base pins of the transfer membrane housing. The base pins lead the electrical contacts of the sensor out of the pressure measuring cell to the electronic circuitry that is extraneous to the system and that serves to supply the sensor system and to amplify the generated signals. Thus, a compact measuring system that can be connected to a pressurized hydraulic or pneumatic system by a simple threaded and measuring adapter cannot be formed.

In particular, for measuring high pressures and for measuring pressures under extreme conditions such as high temperatures, adjusting devices are required to take precise measurements in every range. However, in order to adjust the pressure sensor and to continuously maintain it during the measurements, it is necessary to measure and evaluate the physical parameters prevailing in the immediate environment of the pressure sensor that influence the measuring accuracy of the pressure sensor.

One property of the piezo-resistive measuring cell, which is made from a Si-chip, is that it normally delivers a positive or a negative voltage at pressures of zero bar. In order to use such a measuring cell for a precise pressure measurement, it is necessary to provide an adjustment. Therefore, it is especially important that the measuring cell, with an actual prevailing pressure of zero bar, also precisely indicates a zero bar pressure with zero output voltage.

The voltage delivered from the Si-chip measuring cell is relatively low and therefore has to be amplified. In the known Si-chip and the electrical connections are effected by means of plug-in or threaded contacts. Thus, the signals, and particularly the low-voltage signals, are subject to interference. Such interference must be avoided in order to make a precise measurement.

Thus, there was a need in the prior art for a pressure measuring device capable of measuring high pressures that would avoid interference by measuring the physical parameters that have an adverse effect on the pressure sensor. If possible, such parameters would also be evaluated at the location where they influence the sensor. In this way, these values are not also subject to interference.

In addition, there was a need for such a device that was sturdy, that could readily be connected to hydraulic or pneumatic systems, and that would indicate an exceptionally accurate value with a system pressure of zero bar.

SUMMARY OF THE INVENTION

In accordance with the subject invention, a threaded housing is divided into a pressure chamber that contains a pressure sensor, and a non-pressurized chamber that contains an electronic circuit. The pressure chamber and non-pressurized chamber are connected by borings that accommodate electrical contacts or connecting posts. The pressure chamber is closed to the pressure side of the system by a pressure transferring membrane and is filled with an imcompressible, pressure transmitting medium.

Preferably, the threaded housing includes a ring system that encompasses the pressure chamber and accommodates the pressure-transferring membrane. The ring system has a radial boring that is sealed by an element. The element is ball shaped and insertable into the radial boring under a given pressure. Alternatively, the radial boring is a threaded boring and the sealing element is a threaded element so that a readjustment and a setting can be accomplished at any time.

Also preferably, the pressure chamber includes a sensor adjusting device that is responsive to the pressure of the transmitting medium in the pressure chamber to set the zero point of the pressure sensor. The sensor adjusting device includes a mechnaical pressure switch that has a specific, low response value. The switch closes an electrical circuit that is connected in the electrical circuit of the sensor. The electrical circuit of the adjusting device includes a combination of electrical resistors.

Most preferably, the borings that accommodate the electrical contacts are conical such that the diameter of the boring decreases in the direction of the non-pressurized chamber.

Other details, objects and advantages of the invention will become apparent as the following description of certain presently preferred embodiments thereof proceeds.

BRIEF DESCRIPTION OF THE DRAWINGS

Certain presently preferred embodiment of the subject invention are explained in greater detail by reference to the accompanying drawings wherein:

FIG. 1 is a radial cross section of a preferred embodiment of the pressure measuring device taken through the threaded housing;

FIG. 2 shows a partial longitudinal section of the device shown in FIG. 1;

DESCRIPTION OF THE PREFERRED EMBODIMENT

Figure 3:
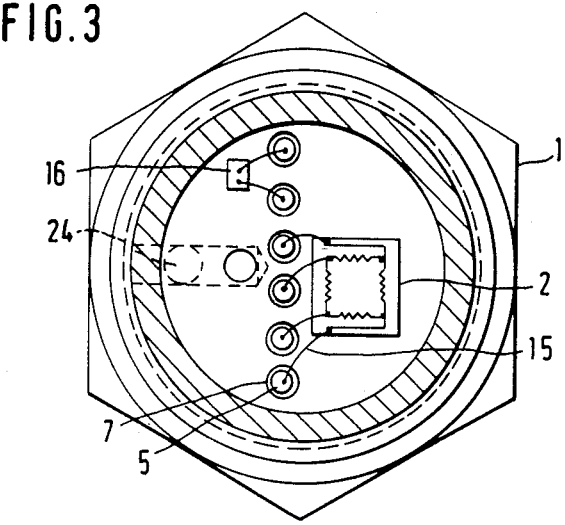
FIG. 3 shows a radial cross section of an alternative embodiment of the disclosed device.

As shown in FIGS. 1 and 2, the disclosed device for measuring high pressures and temperatures includes a threaded housing 1 having a pressure chamber 4 and a non-pressurized chamber 6. Borings 7 are located between pressure chamber 4 and non-pressurized chamber 6 and are aligned substantially parallel to the longitudinal axis of threaded housing 1.

Housing 1 includes a ring 8 and a conically increasing cover plate 11. Housing 1 cooperates with a pressure-transmitting membrane 3 that is welded between rings 8 and cover plate 11 to define pressure chamber 4. Housing 1 is also provided with a screw thread 17 and with an adjacently located o-ring 18 such that is can be threadingly connected to an adapter and, thereby, secured to a pressurized fluid system. Pressure-transmitting membrane 3 isolates pressure chamber 4 from the fluid system and cover plate 11 protects membrane 3 from being mechanically damaged.

Pressure chamber 4 contains an analog pressure sensor 2, analog temperature sensor 16, and a pressure switch 13. The balance of pressure chamber 4 is filled with chemically inert, electrically insulating, separating fluid that provides for a pressure conversion in a ratio of substantially 1:1.

Pressure sensor 2 is mounted on a connecting post that is located in one of borings 7. Connecting post 5 is provided with a head at the end adjacent pressure chamber 4. Mounting sensor 2 on connecting post 5 in this way makes pressure sensor 2 more sensitive to the pressure waves transmitted through the insulating fluid with less interference.

In the example of FIGS. 1 and 2, pressure switch 13 and temperature sensor 16 are connected to the wall of housing 1. Temperature sensor 16 adjusts the output of the pressure measuring device in response to changes in the temperature of the pressure transmitting fluid in pressure chamber 4. Pressure switch 13 is a foil pressure switch that is electrically connected to an electrical circuit that is connected to the electrical circuit of the pressure sensor. Pressure switch 13 has a specific, low switching pressure that is adjustable. The electrical circuit includes electrical resistors that are combinable to adjust the zero point of pressure sensor 2.

Pressure sensor 2, pressure switch 13 and temperature sensor 16 are electrically connected through electrical leads 15 and electrical contacts to an electronic circuit 14 that is located in non-pressuized chamber 6. Electronic circuit 14 is a hybrid amplifier that amplifies the relatively low output signals provided by pressure sensor 2.

The electrical contacts are located in a plurality of borings 7 that are arranged in a straight line. The linear arrangement of the electrical contacts thus provided is in contrast to conventional plugs as known in the prior art and provides an arrangement of electrical contacts that is compatible with electronic circuit 14.

The electrical contacts and connecting posts 5 are insulated from the wall of borings 7 by a pressure-proof insulation of glass filling. Housing borings 7 that accommodate the electrical contacts and the connecting posts 5 are conically shaped with the boring diameter decreasing in the direction from pressure chamber 4 to non-pressurized chamber 6. In the disclosed embodiment, the taper is at a ratio of substantially 1:50. This conical shape supports against the pressure in pressure chamber 4 and protects the disclosed device against large pressure differentials between pressure chamber 4 and non-pressurized chamber 6.

In the operation of the embodiment of FIGS. 1 and 2, the piezo-resistive pressure sensor and the semiconductor chip 2 measures the system pressure that is transmitted at a 1:1 ratio through membrane 3 and the insulating fluid in pressure chamber 4. Sensor 2 converts the measured pressure to a proportional voltage. The voltage output of sensor 2 is than amplified by integrated amplifier 14.

The integrated arrangement of the sensor 2 and amplifier 14 in housing 1 of the disclosed device provides short electrical connections between the sensor and the amplifier so that low-level signals can be better received and amplified. This arrangement, together with the mounting of sensor 2 on connecting post 5, provides a signal level that is particularly free from interference. Thus, the preferred embodiment of the subject invention can continuously and simultaneously detect and measure small changes in both pressure and temperature. Experimental results of the subject invention show that measuring ranges go up to nominal pressures of 440 bar with 100% overload stability. Peak pressures of up to 600 bar can be covered with the temperature ranging between −20° C. to +120° C.

Figure 4:
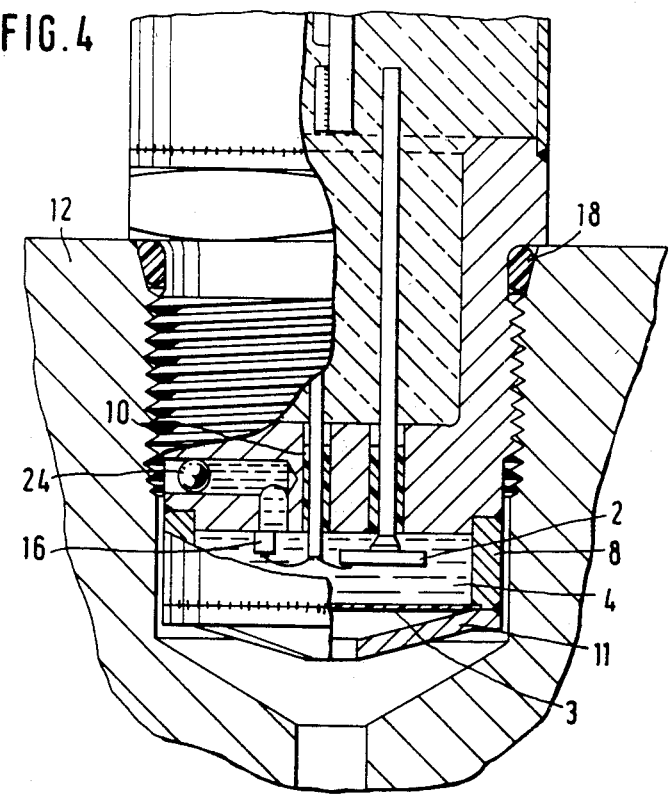
FIG. 4 shows a partial longitudinal section of the device shown in FIG. 3.

FIGS. 3 and 4 show a cross section and a longitudinal section of an alternative embodiment of the invention wherein a sealing element or ball 24 is located in an angle boring 26 of housing 1. Temperature sensor 16 and pressure sensor 2 are located in pressure chamber 4 which is filled with insulating fluid.

Figure 5:
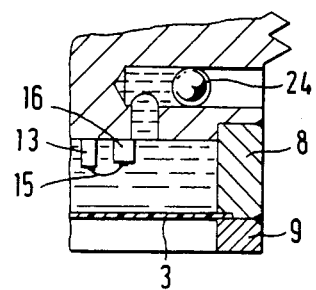
FIGS. 5, 6 and 7 shown partial sections of further alternative embodiments of the subject invention.

FIG. 5 shows a partial section of another alternative embodiment herein ball 24 is located in an angle boring in housing 1. Membrane 3 is welded between two rings 8 and 9 that are components of housing 1. Pressure sensor 2 and temperature sensor 16 are located inside pressure chamber 4.

Figure 6:
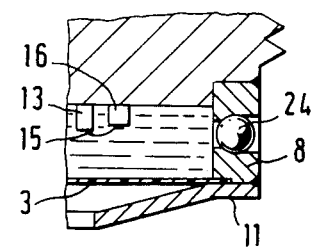

FIG. 6 shows a variation of the embodiment shown in FIG. 5 wherein ball 24 is located in a radial boring in ring 8. Membrane 3 is welded between ring 8 and cover plate 11.

Figure 7:
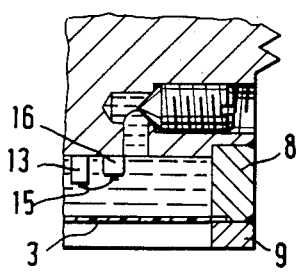

FIG. 7 shows another embodiment wherein the sealing element is a threaded member that is threadingly engaged in an angle boring in housing 1.

While certain presently preferred embodiments of the subject invention are shown and described herein, the subject invention is not limited thereto, but can be otherwise variously embodied within the scope of the following claims.

I claim:

1. A device for measuring pressure in a fluid system, said device comprising:
    a housing that includes a ring system having a radial boring, said housing having a pressure chamber and a non-pressurized chamber, said pressure chamber being connected to said non-pressurized chamber by borings;
    electrical contacts and connecting posts that are located in said borings;
    an electronic circuit that is located in the non-pressurized chamber of said housing and that is electrically connected to said electrical contacts;
    a pressure sensor located in the pressure chamber of said housing and that is electrically connected to said electrical contacts;
    a pressure transferring membrane that separates said pressure chamber from the fluid system, said membrane contacting the ring system of said housing and cooperates with said ring system to define the pressure chamber;
    an incompressible, pressure transmitting medium that fills said pressure chamber; and
    an element that seals the radial boring of said ring system.

2. The pressure measuring device of claim 1 wherein said sealing element is a ball shaped member that is insertable into the radial boring of said ring system under given pressure.

3. The pressure measuring device of claim 1 wherein said housing includes an angled boring and wherein said sealing element is located in the angled boring.

4. The pressure measuring device of claim 1 wherein said radial boring is a threaded boring and wherein said sealing element is a threaded element.

5. The pressure measuring device of claim 1 further comprising:
    means for adjusting said pressure sensor, said adjusting means being located in said pressure chamber and responsive to the pressure in said pressure chamber.

6. The pressure measuring device of claim 5 wherein said pressure sensor includes an electrical circuit that is located in said pressure chamber, and wherein said adjusting means comprises:
    a mechanical pressure switch having a given switching pressure; and
    an electrical circuit that is electrically connected to said mechanical pressure switch and to the electrical circuit of the pressure sensor.

7. The pressure measuring device of claim 6 wherein said sensor adjusting means includes electrical resistors that are selectively combinable to control the zero point for output voltage of the pressure sensor.

8. The pressure measuring device of claim 7 wherein said sensor adjusting means includes a foil pressure switch.

9. The pressure measuring device of claim 1 wherein the borings that accommodate the electrical contacts are conical such that the diameter of the boring decreases in the direction from the pressure chamber to the non-pressurized chamber.

10. The pressure measuring device of claim 9 wherein the conicity of said borings is at the ratio of substantially 1 to 50.

11. The pressure measuring device of claim 1, 2, 3, 4, 5, 6, 7, 8, 9, or 10 wherein said pressure sensor is located adjacent a wall of said housing that separates the pressure chamber from the non-pressurized chamber.

12. The pressure measuring device of claim 1, 2, 3, 4, 5, 6, 7, 8, 9, or 10 wherein said electronic circuit comprises: a hybrid amplifier that amplifies output signals from the pressure sensor.

13. The pressure measuring device of claim 1, 2, 3, 4, 5, 6, 7, 8, 9, or 10 wherein said housing is threaded such that it can threadingly engage an adaptor that is arranged to be coupled to the fluid system.

14. The pressure measuring device of claim 1, 2, 3, 4, 5, 6, 7, 8, 9, or 10 further comprising:
    a temperature sensor that is located in the pressure chamber of said housing, said temperature sensor adjusting the output of the pressure measuring device in response to changes in the temperature of said pressure transmitting medium.

* * * * *